US009291241B2

(12) United States Patent
Itoo et al.

(10) Patent No.: US 9,291,241 B2
(45) Date of Patent: Mar. 22, 2016

(54) TRANSMISSION

(71) Applicant: KAWASAKI JUKOGYO KABUSHIKI KAISHA, Hyogo (JP)

(72) Inventors: Seiji Itoo, Akashi (JP); Ayumi Hamada, Akashi (JP); Taisuke Morita, Amagasaki (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/258,200

(22) Filed: Apr. 22, 2014

(65) Prior Publication Data
US 2015/0300453 A1 Oct. 22, 2015

(51) Int. Cl.
*F16H 1/02* (2006.01)
(52) U.S. Cl.
CPC ........................................ *F16H 1/02* (2013.01)
(58) Field of Classification Search
CPC .......................................................... F16H 1/02
USPC ........................................ 180/233; 74/606 R
See application file for complete search history.

(56) References Cited

U.S. PATENT DOCUMENTS

| | | | | |
|---|---|---|---|---|
| 5,975,762 A * | 11/1999 | Ai | ............................ | F16C 19/38 384/450 |
| 7,377,342 B2 * | 5/2008 | Miyazaki | ............... | B60K 23/08 180/233 |
| 7,644,789 B2 | 1/2010 | Miyazaki et al. | | |
| 8,365,621 B2 * | 2/2013 | Matsumoto | ............. | F16H 63/16 74/325 |
| 2014/0090497 A1 * | 4/2014 | Eifert | ................... | B60K 17/046 74/325 |

FOREIGN PATENT DOCUMENTS

JP   2006-82662   3/2006

* cited by examiner

*Primary Examiner* — Joseph Rocca
*Assistant Examiner* — Felicia L Brittman
(74) *Attorney, Agent, or Firm* — Wenderoth, Lind & Ponack, L.L.P.

(57) ABSTRACT

A vehicle-use transmission includes: an input shaft into which a driving force from an engine is inputted; a power extraction shaft for transmitting the driving force of the input shaft to front wheels; a transmission mechanism for transmitting the driving force of the input shaft to rear wheels; and a rear-wheel intermediate shaft provided in a power transmission path between the power extraction shaft and the transmission mechanism. The rear-wheel intermediate shaft transmits the driving force through a helical gear attached to the rear-wheel intermediate shaft. Further, the rear-wheel intermediate shaft is supported by tapered roller bearings.

8 Claims, 5 Drawing Sheets

TRANSMISSION

BACKGROUND OF THE INVENTION

1. Field of the Invention

The present invention relates to a vehicle-use transmission.

2. Description of the Related Art

In the conventional art, in a utility vehicle in which switching is allowed between a two-wheel drive mode and a four-wheel drive mode, in a transmission for transmitting a driving force from an engine, as disclosed in Japanese Laid-Open Patent Publication No. 2006-82662, a power extraction shaft is provided for extracting the driving force from the engine. Hence, the power is transmitted from the power extraction shaft to front wheels and rear wheels.

SUMMARY OF THE INVENTION

Here, when a predetermined shaft-to-shaft distance is provided between the power extraction shaft and the rear axle, in order to obtain a predetermined reduction gear ratio or a strength, the diameter of a gear provided in the power extraction shaft or the diameter of a gear provided in the rear axle needs to be made larger. Alternatively, a rear-wheel intermediate shaft needs to be provided between the power extraction shaft and the rear axle. Then, when the rear-wheel intermediate shaft is to be provided, reduction of gear sound is preferred.

Thus, an object of the present invention is to provide a transmission in which gear sound can be reduced in a state that a predetermined shaft-to-shaft distance is ensured between a power extraction shaft and a rear axle.

In order to achieve the above-mentioned object, the present invention is a vehicle-use transmission comprising: an input shaft into which a driving force from an engine is inputted; a power extraction shaft for transmitting the driving force of the input shaft to front wheels; a transmission mechanism for transmitting the driving force of the input shaft to rear wheels; and a rear-wheel intermediate shaft provided in a power transmission path between the power extraction shaft and the transmission mechanism. The rear-wheel intermediate shaft transmits the driving force through a helical gear attached to the rear-wheel intermediate shaft. The rear-wheel intermediate shaft is supported by tapered roller bearings.

According to the above-mentioned configuration, the rear-wheel intermediate shaft is provided between the power extraction shaft and the transmission mechanism so that in a state in which a predetermined shaft-to-shaft distance is ensured between the power extraction shaft and the rear axle, gear sound can be reduced by the helical gear attached to the rear-wheel intermediate shaft. Further, the thrust load increased by the helical gear can be supported by the tapered roller bearings without the necessity of employing a bearing of larger diameter.

Preferably, the present invention further employs the following configurations.

(1) The tapered roller bearings are provided on both sides of the helical gear in the form of a pair. Between the helical gear and one of the tapered roller bearings located near the helical gear, an elastic member abutting against the helical gear and a collar abutting against the elastic member and the one of the tapered roller bearings is provided. The tapered roller bearings are precompression-adjusted by the elastic member.

(2) In the above-mentioned configuration (1), the elastic member includes a dish spring.

(3) Each of the tapered roller bearings includes: an outer race abutting against a transmission case of the transmission; an inner race abutting against the rear-wheel intermediate shaft; and rollers revolving and located between the outer race and the inner race. The tapered roller bearings are provided such that the vertex of a cone formed by the rollers is formed in the direction of a shaft end of the rear-wheel intermediate shaft.

(4) A transmission case of the transmission is constructed from cases divided into right and left.

According to the above-mentioned configuration (1), at the time of attachment, a pressure can be applied in advance onto the tapered roller bearings by the elastic member.

The above-mentioned configuration (2) provides a detailed configuration of the elastic member. Then, according to the present configuration, precompression onto the tapered roller bearings can be achieved easily.

According to the above-mentioned configuration (3), the thrust load generated by the helical gear can be supported effectively.

According to the above-mentioned configuration (4), when the tapered roller bearings are employed, size increase in the transmission case can be avoided. Further, the transmission case can be constructed from cases divided into right and left portions without the necessity of separately providing a cover in the transmission case.

In summary, the present invention provides a transmission in which gear sound can be reduced in a state in which a predetermined shaft-to-shaft distance is ensured between a power extraction shaft and a rear axle.

DETAILED DESCRIPTION OF THE INVENTION

Overall Structure of Vehicle

Figure 1:
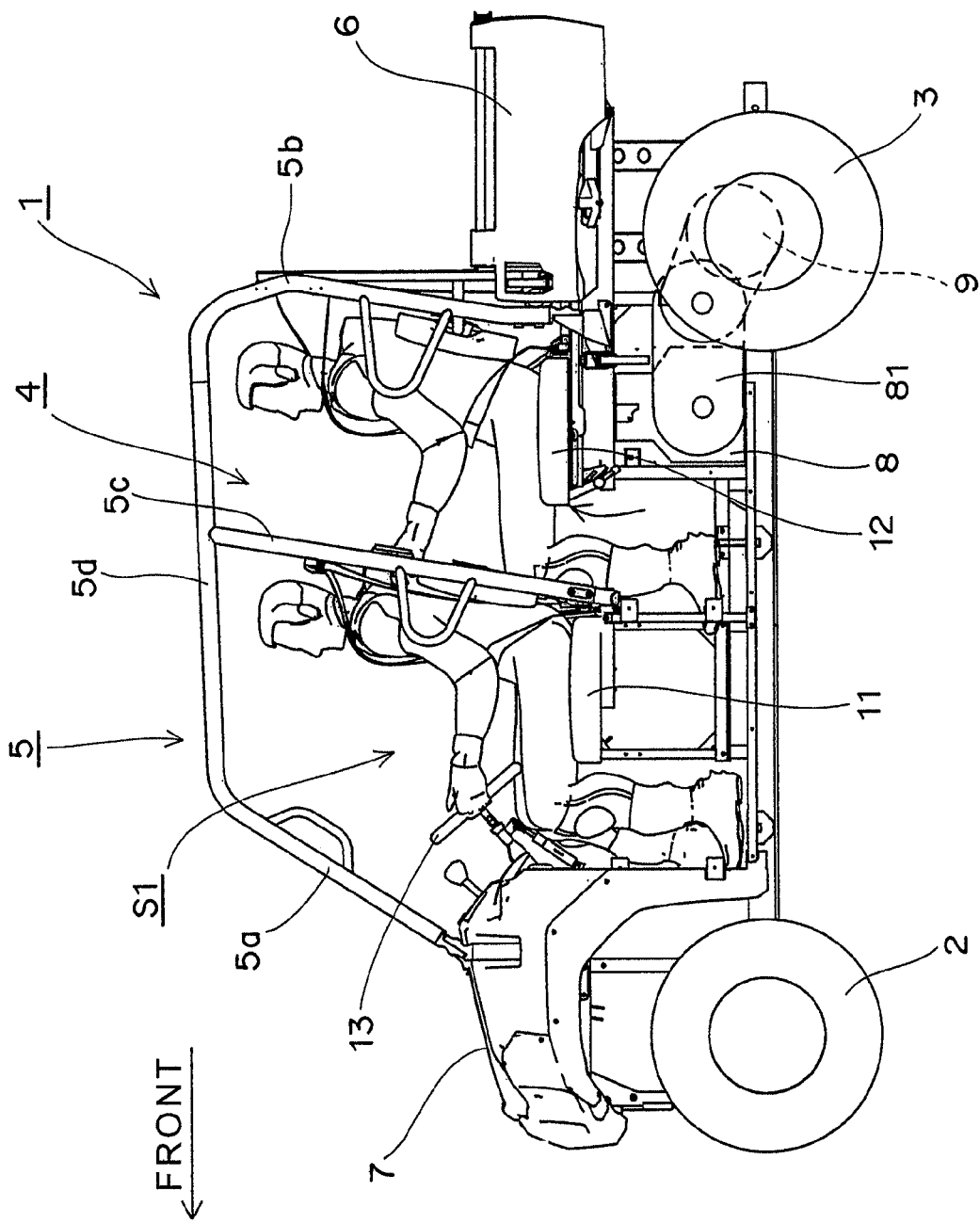
FIG. 1 is a left side view of a utility vehicle according to an embodiment of the present invention.
Figure 2:
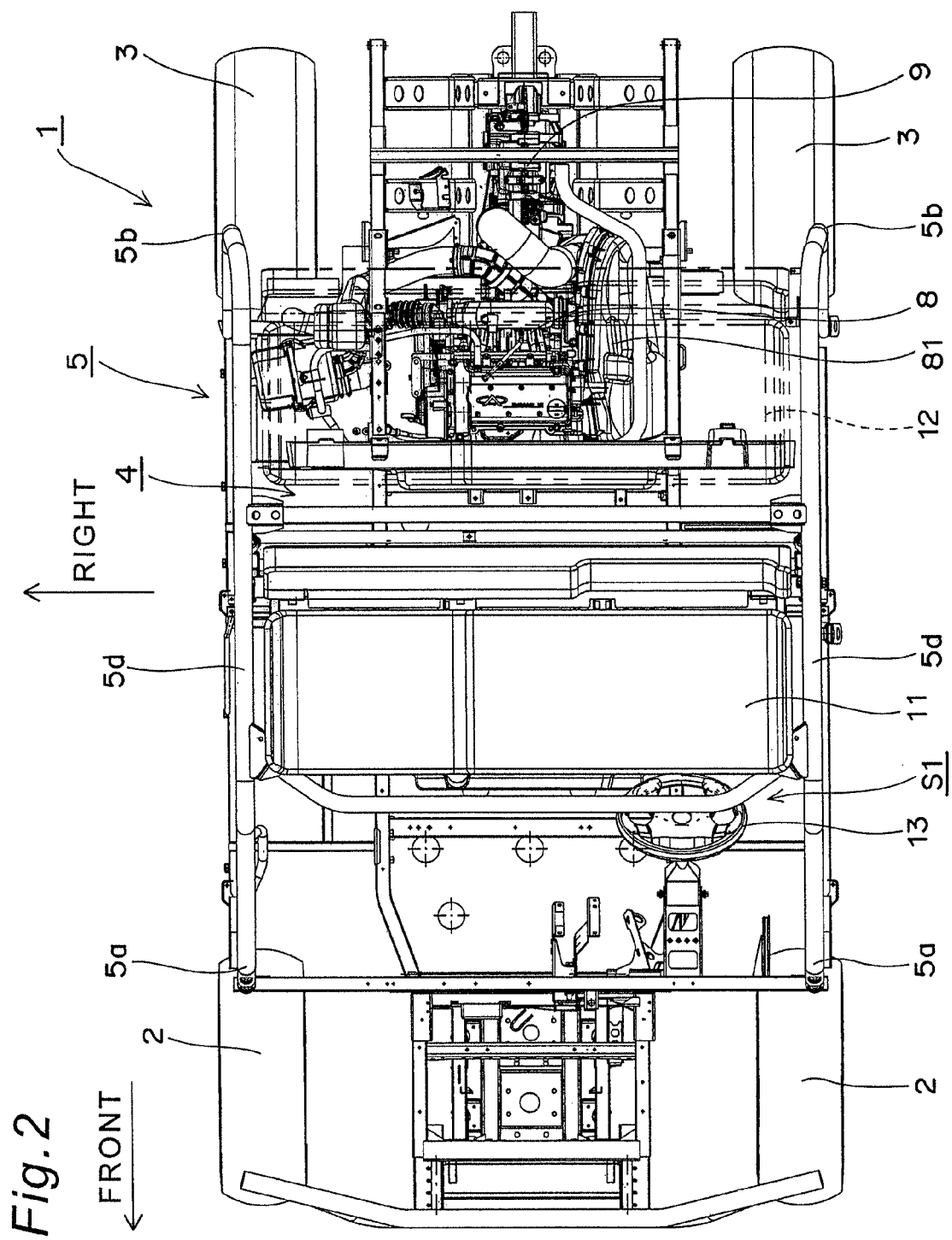
FIG. 2 is a top view of a utility vehicle shown in FIG. 1.

FIG. 1 is a left side view of a utility vehicle according to an embodiment of the present invention. Here, the notation of direction employed in the present embodiment is defined as the same as those viewed from a driver of the utility vehicle. FIG. 2 is a top view of the utility vehicle shown in FIG. 1.

As shown in FIGS. 1 and 2, in the utility vehicle 1, a pair of right and left front wheels 2 are provided in the front part of the vehicle body and a pair of right and left rear wheels 3 are provided in the rear part of the vehicle body. Further, a cabin space (a cabin) 4 is provided between the front wheels 2 and the rear wheels 3. The cabin space 4 is surrounded by a ROPS 5. The ROPS 5 is an abbreviation of a rollover protective structure, which constitutes a part of the vehicle body frame. Then, the ROPS 5 includes: a pair of right and left front vertical members 5a; a pair of right and left rear vertical members 5b; a pair of right and left intermediate vertical members 5c arranged between the front vertical members 5a and the rear vertical members 5b; and a plurality of upper end beam members 5d for linking the upper end parts of the individual vertical members 5a, 5b, and 5c. Then, a loading platform 6 is provided behind the cabin space 4 and a bonnet 7 is provided in front of the cabin space 4. A front sheet 11 of bench type is provided in the frontward half part of the cabin space 4 and a rear sheet 12 of bench type is provided in the rearward half part of the cabin space 4. A sheet region S1 in the left side part of the front sheet 11 is a driver's seat and an operation section such as a steering wheel 13 is provided in front of the left-side sheet region S1.

An engine 8 is arranged under the rear sheet 12. Then, a transmission 9 for converting the driving force from the engine 8 and then transmitting it to the wheels is arranged behind the engine 8. The engine 8 and the transmission 9 are formed separately or integratedly with each other. Then, the driving force of the engine 8 is transmitted to the transmission 9 through a belt converter 81 attached to the left side surface of the engine 8 and the left side surface of the transmission 9. The belt converter 81 includes a V-belt type continuously variable transmission, where automatic transmission control is performed in accordance with the revolving speed of the engine 8 and an increase or decrease of the load on the wheel side.

[Structure of Transmission]

Figure 3:
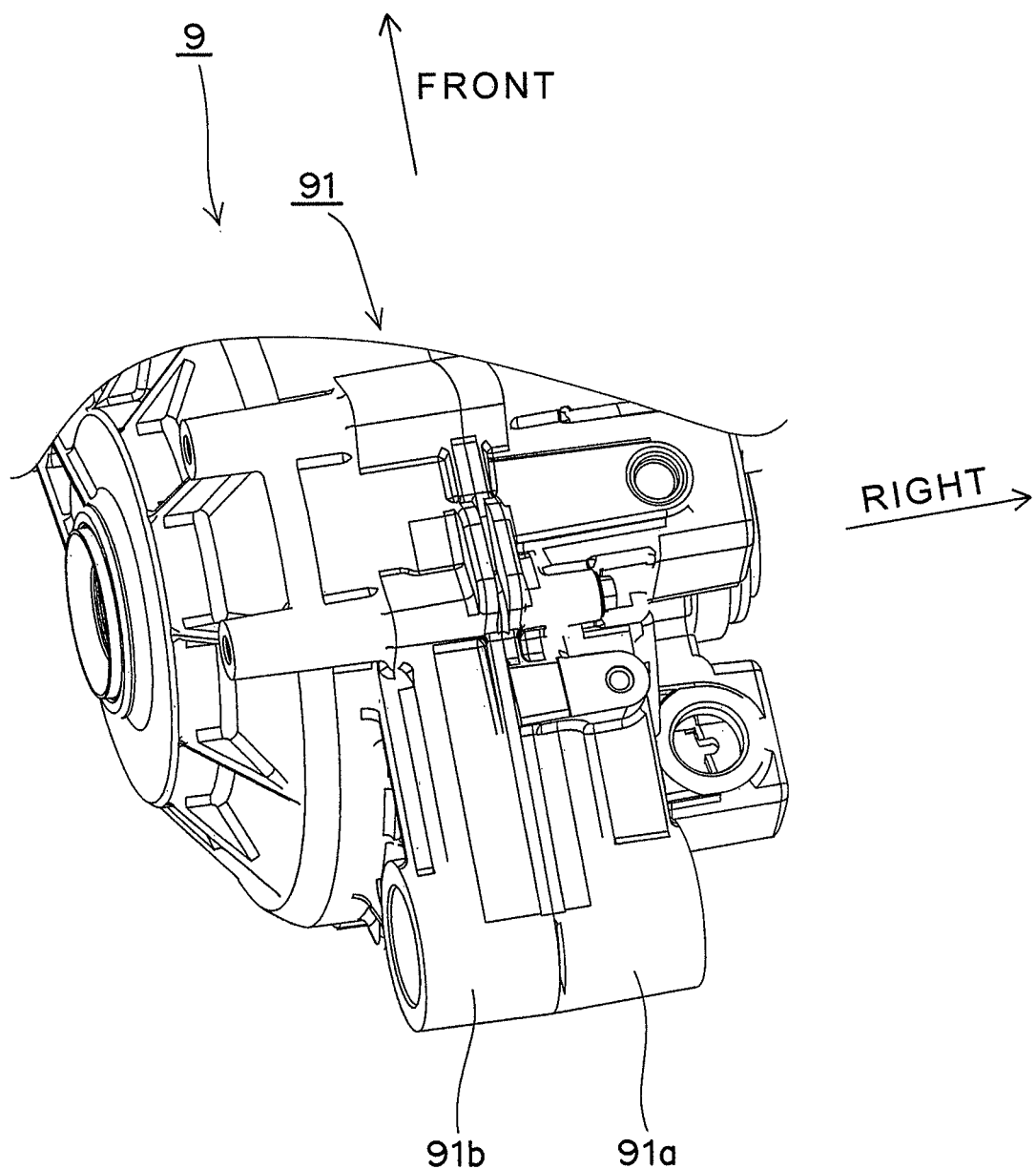
FIG. 3 is a rearward perspective view of a transmission.

FIG. 3 is a rearward perspective view of the transmission 9. As shown in FIG. 3, a transmission case 91 forming the outline of the transmission 9 is fabricated by joining a pair of left and right transmission case members 91a and 91b at the central mating surface.

Figure 4:
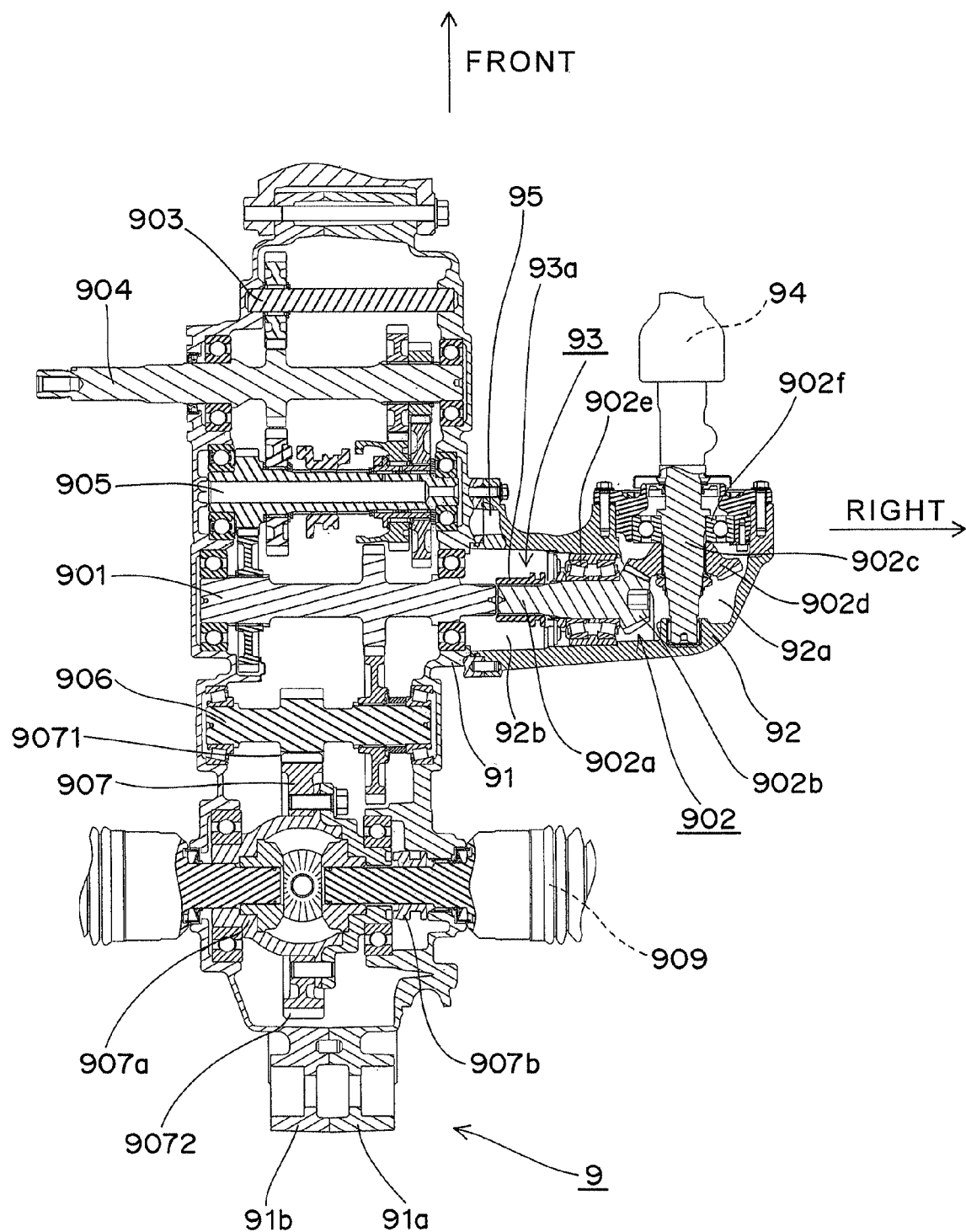
FIG. 4 is a cross sectional development view taken along a line passing individual shafts of a transmission.

FIG. 4 is a cross sectional development view taken along a line passing individual shafts of the transmission 9. The transmission 9 includes: the transmission case 91 accommodating a transmission mechanism; and a power extraction case 92 linked to the side wall of the transmission case 91 and accommodating a gear type power extraction mechanism 902 linked to a power extraction shaft 901 of the transmission mechanism. The power extraction case 92 includes: a gear accommodation chamber 92a for accommodating the gear type power extraction mechanism 902; and an intermediate transmission chamber 92b for establishing fluid communication between the gear accommodation chamber 92a and the inside of the transmission case 91. In the inside of the transmission 9, in the order from front to rear, provided are: an input shaft 904 for receiving a driving force from the engine 8 (FIG. 2); a counter shaft 905 for transmitting the driving force of the input shaft 904 to the power extraction shaft 901; the power extraction shaft 901; a rear-wheel intermediate shaft 906 for transmitting the driving force of the power extraction shaft 901; and a final slow-down mechanism 907 for finally slowing down the driving force of the rear-wheel intermediate shaft 906 and then transmitting the obtained driving force to a rear axle 909. Further, in a lower part between the input shaft 904 and the counter shaft 905, a reverse idler shaft 903 is arranged for reversing the revolution direction. Here, FIG. 4 shows the reverse idler shaft 903 in a state of being developed in the frontward of the input shaft 904. A driven pulley (not shown) of the belt converter (FIG. 2) is attached to the input shaft 904. Then, the driving force from the engine 8 (FIG. 2) is inputted to the input shaft 904 through a V-belt wound around between the driven pulley and a drive pulley (not shown) attached to the output shaft of the engine 8 (FIG. 2).

The final slow-down mechanism 907 includes a pinion 9071, a chain sprocket 9072, a differential mechanism 907a, and a differential locking mechanism 907b. Then, the driving force transmitted from the rear-wheel intermediate shaft 906 is transmitted and distributed to the right and left rear wheels 3 (FIG. 2) by the differential mechanism 907a. The differential locking mechanism 907b controls the fixing and release of the differential mechanism 907a. Then, when the differential locking mechanism 907b fixes the differential mechanism 907a, the differential of the right and left rear wheels 3 (FIG. 2) is fixed.

In the intermediate transmission chamber 92b, a switching mechanism 93 is arranged for switching, between a connected state and a disconnected state, power transmission between the power extraction shaft 901 and the gear type power extraction mechanism 902. The gear type power extraction mechanism 902 includes a bevel gear mechanism and includes: a first bevel gear 902b provided with a first shaft 902a on the input side; and a second bevel gear 902d provided with a second shaft 902c on the output side. The switching mechanism 93 includes: a switching sleeve 93a spline-fit onto the power extraction shaft 901 and the first shaft 902a in a slidable manner in the axial direction; and an actuator (not shown) for causing the switching sleeve 93a to move in the axial direction. The actuator is caused to electrically operate by a changeover switch (not shown) provided near the driver's seat. When the actuator operates, the switching sleeve 93a is moved in the axial direction so that the power extraction shaft 901 and the first shaft 902a are brought into a connected state or a disconnected state. Further, the first shaft 902a is supported in a revolvable manner in the power extraction case 92 by the tapered roller bearing 902e of two-row construction. The second shaft 902c is supported in a revolvable manner in the outlet part of the power extraction case 92 by a ball bearing 902f. The tapered roller bearing 902e is arranged between the gear accommodation chamber 92a and the intermediate transmission chamber 92b.

A front-wheel propeller shaft 94 for driving the front wheels (FIG. 2) is linked to the front end of the second shaft 902c on the output side, and extends frontward. The front-wheel propeller shaft 94 is constructed from a plurality of propeller shaft members linked to each other with joints. The driving force of the first shaft 902a is transmitted through the bevel gear 902b and the bevel gear 902d to the front-wheel propeller shaft 94. As a result, the driving force of the front-wheel propeller shaft 94 is transmitted to the front axle so that the front wheels (FIG. 2) are revolved. Thus, in the present embodiment, the switching mechanism 93 switches whether the driving force is transmitted or not transmitted to the front wheels (FIG. 2), and hence corresponds to the two-wheel drive to four-wheel drive switching mechanism.

Switching between two-wheel drive and four-wheel drive is described below. In a two-wheel drive mode in which the driving force of the engine 8 is not transmitted to the front wheels 2, when the driver pushes the changeover switch provided near the driver's seat, the actuator operates so as to move the switching sleeve 93a in the axial direction (leftward). As a result, the power extraction shaft 901 and the first shaft 902a are linked to each other through the switching sleeve 93a so that the driving force of the power extraction shaft 901 is transmitted to the first shaft 902a. Then, the driving force of the first shaft 902a is transmitted through the bevel gear 902b and the bevel gear 902d to the front-wheel propeller shaft 94. Then, the driving force of the front-wheel propeller shaft 94 is transmitted to the front axle so that the front wheels 2 (FIGS. 1 and 2) are revolved. As a result, the driving force of the engine 8 is transmitted to the front wheels 2 and the rear wheels 3 (FIGS. 1 and 2) and hence the utility vehicle 1 is operated in a four-wheel drive mode.

In the four-wheel drive mode in which the driving force of the engine 8 is transmitted to the front wheels 2, when the driver pushes the changeover switch provided near the driver's seat, the actuator operates so as to move the switching sleeve 93a in the axial direction (rightward). As a result, connection between the power extraction shaft 901 and the first shaft 902a is released and hence the driving force of the power extraction shaft 901 is not transmitted to the first shaft 902a. As a result, the driving force of the engine 8 is transmitted to the rear wheels 3 alone so that the utility vehicle 1 is operated in the two-wheel drive mode.

Figure 5:
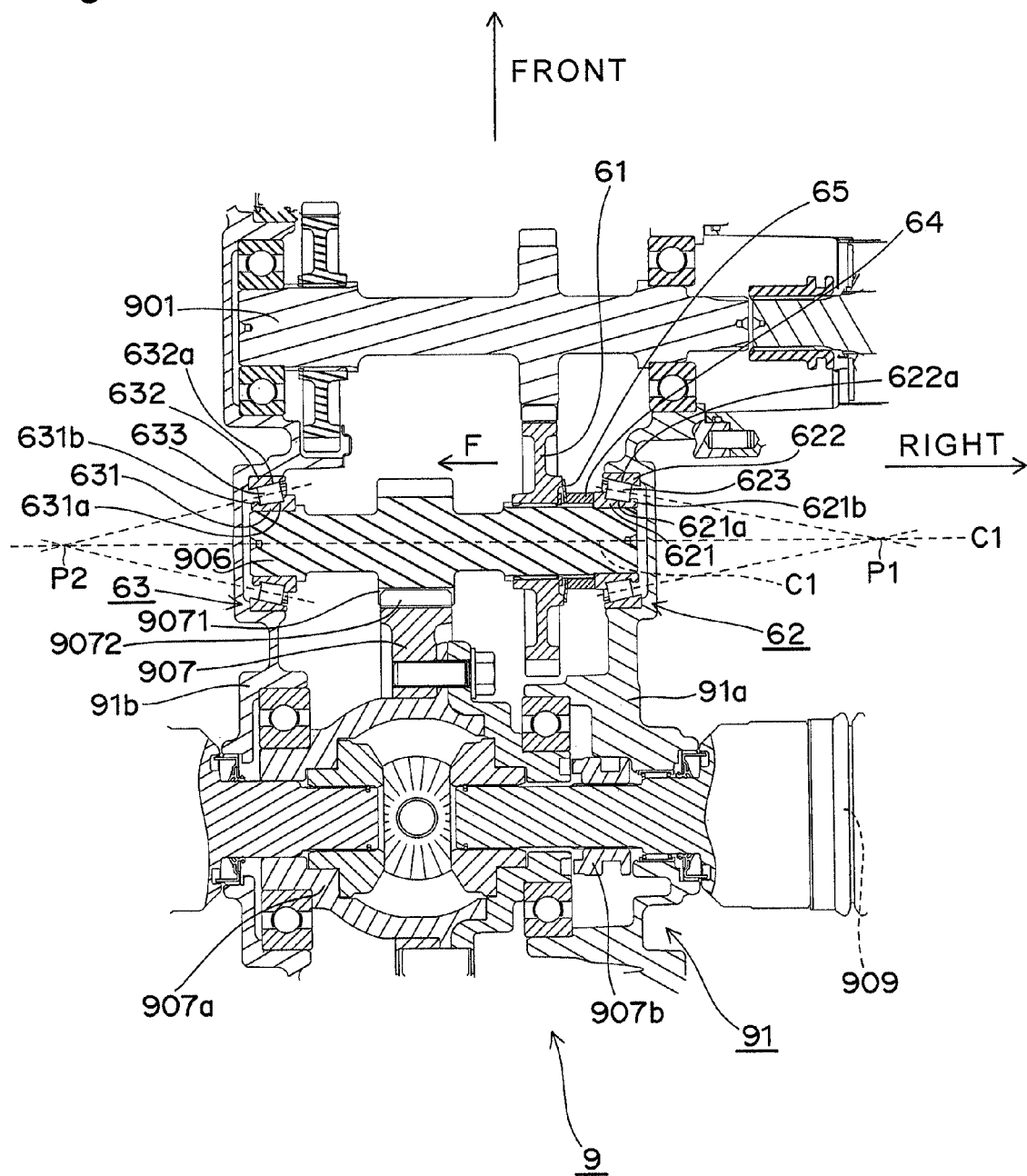
FIG. 5 is an enlarged view of a rear-wheel intermediate shaft part of FIG. 4.

FIG. 5 is an enlarged view of a rear-wheel intermediate shaft 906 part of FIG. 4. As shown in FIG. 5, a helical gear 61 is provided in the rear-wheel intermediate shaft 906. Then, the rear-wheel intermediate shaft 906 transmits the driving force of the power extraction shaft 901 through the helical gear 61 to the final transmission mechanism 907. The gear teeth of the helical gear 61 are oriented in an inclined manner such that the thrust load acts in the direction F at the time of forward movement revolution. Both end parts of the rear-wheel intermediate shaft 906 are supported by the transmission case 91 via a pair of right and left tapered roller bearings 62 and 63.

The tapered roller bearing 62 includes: an inner race 621 engaging with the rear-wheel intermediate shaft 906; an outer race 622 engaging with the transmission case member 91a; and rollers 623 provided between the inner race 621 and the outer race 622. Each roller 623 has a truncated conical shape. The tapered roller bearing 63 includes: an inner race 631 engaging with the rear-wheel intermediate shaft 906; an outer race 632 engaging with the transmission case member 91b; and rollers 633 provided between the inner race 631 and the outer race 632. Similarly to the roller 623, each roller 633 also has a truncated conical shape.

The tapered roller bearings 62 and 63 are constructed such that an imaginary extension of a raceway surface 621a or 631a of the inner race 621 or 631, an imaginary extension of a raceway surface 622a or 632a of the outer race 622 or 632, and the vertex P1 or P2 of the imaginary cone of the rollers 623 or 633 intersect with each other at one intersection point on an extended line of the direction of a shaft end part of a center line C1 (i.e., a longitudinal center line) of the rear-wheel intermediate shaft 906. As illustrated in FIG. 5, the intersection point P1, P2 for each respective roller bearing 62, 63 is located outside of the rear-wheel intermediate shaft 906 beyond the shaft end closest to the respective roller bearing 62, 63. Then, the rollers 623 or 633 revolve in a manner of being guided and pressed against a flange 621b or 631b of the inner race 621 or 631 by a resultant force exerted from the inner-race raceway surface 621a or 631a and the outer-race raceway surface 622a or 632a. Thus, the tapered roller bearings 62 and 63 are arranged such that the flanges 621b and 631b are located opposite to both end parts of the rear-wheel intermediate shaft 906.

The inner peripheral edge of a dish spring 65 serving as the elastic member abuts against the inner race 621 of the one tapered roller bearing 62 with a sleeve 64 in between. Further, the outer peripheral edge of the dish spring 65 abuts against the helical gear 61. Then, attachment is performed in a state in which the tapered roller bearing 62 is precompressed against the transmission case 91 by the dish spring 65. Here, the dish spring 65 abuts against the one tapered roller bearing 62 with the sleeve 64 in between. However, the rear-wheel intermediate shaft 906 is supported by the transmission case 91 via the pair of right and left tapered roller bearings 62 and 63 located at both ends. Thus, when the one tapered roller bearing 62 is biased by the dish spring 65, the other tapered roller bearing 63 is biased simultaneously.

According to the utility vehicle 1 having the above-mentioned configuration, the following effects are obtained.

(1) the rear-wheel intermediate shaft 906 is provided between the power extraction shaft 901 and the final transmission mechanism 907 so that in a state that a predetermined shaft-to-shaft distance is ensured between the power extraction shaft 901 and the rear axle 909, gear sound can be reduced by the helical gear 61 attached to the rear-wheel intermediate shaft 906. Further, the thrust load increased by the helical gear 61 can be supported by the tapered roller bearings 62 and 63 without the necessity of employing a bearing of larger diameter.

(2) The tapered roller bearings 62 and 63 are precompression-adjusted by the elastic member 65. Thus, at the time of attachment, a pressure can be applied in advance onto the tapered roller bearings 62 and 63 by the elastic member 65.

(3) Precompression onto the tapered roller bearings 62 and 63 is achieved easily by the dish spring serving as the elastic member 65.

(4) The tapered roller bearings 62 or 63 are provided such that the vertex of a cone formed by the rollers 623 or 633 is formed in the direction of (i.e., extending from) a shaft end of the rear-wheel intermediate shaft 906. Thus, the thrust load generated by the helical gear 61 can be supported effectively.

(5) The tapered roller bearings 62 and 63 are employed as a pair of right and left bearings. Thus, large values are allowed for the radial road and the axial load of the rear-wheel intermediate shaft 906.

(6) When the tapered roller bearings 62 and 63 are employed, size increase in the transmission case 91 can be avoided. Further, the transmission case 91 can be constructed from cases divided into right and left without the necessity of separately providing a cover in the transmission case 91. In particular, in the present embodiment, the transmission case 91 is fabricated by joining a pair of right and left transmission case members 91a and 91b at the central mating surface. Hence, the transmission case 91 is constructed from the transmission case members 91a and 91b divided into two parts of right and left. Thus, assembling and decomposition of the transmission case 91 are achieved easily.

(7) In the intermediate transmission chamber 92b, the switching mechanism 93 is arranged for switching, between a connected state and a disconnected state, power transmission between the power extraction shaft 901 and the gear type power extraction mechanism 902. Then, the switching mechanism 93 can switch power transmission from the power extraction shaft 901.

(8) The switching mechanism 93 is provided for switching connection or non-connection between the power extraction shaft 901 and the front-wheel propeller shaft 94 for driving the front wheels 2. Thus, switching between two-wheel drive and four-wheel drive of the utility vehicle 1 is achieved.

(9) The final slow-down mechanism 907 is provided with the differential locking mechanism 907b. Then, the differential locking mechanism 907b can fix the differential of the rear wheels 3 so as to avoid useless revolution.

(10) The engine 8 and the transmission 9 are formed separately from each other. Then, the reverse idler shaft 903, the input shaft 904, the counter shaft 905, the power extraction shaft 901, the rear-wheel intermediate shaft 906, and the final slow-down mechanism 907 are accommodated in the transmission case 91. Thus, the above-mentioned individual shafts and the final slow-down mechanism 907 can be arranged compact.

(11) The power transmission path between the power extraction shaft 901 and the final slow-down mechanism 907 is provided with the rear-wheel intermediate shaft 906. Thus, the gear diameters in the gear group provided in the power extraction shaft 901 and the gear diameters in the gear group provided in the rear-wheel intermediate shaft 906 can be reduced in a state that a predetermined shaft-to-shaft distance is ensured between the power extraction shaft 901 and the rear axle 909. This avoids size increase in the transmission 9.

In the above-mentioned embodiment, the transmission mechanism for transmitting the driving force of the input shaft 904 to the rear wheels has been composed of the final slow-down mechanism 907. However, the employed transmission mechanism is not limited to the final slow-down mechanism 907 and may be any transmission mechanism as long as the transmission mechanism is provided in the power transmission path from the input shaft 904 to the rear axle 909 and a rear-wheel intermediate shaft is provided in the power transmission path between the power extraction shaft 901 and the transmission mechanism.

In the above-mentioned embodiment, the front seat 11 and the rear seat 12 are of bench type. Instead, a box type may be employed.

In the above-mentioned embodiment, the counter shaft 905 has been provided in a singular number. Instead, a plurality of counter shafts may be provided. Alternatively, a counter shaft may be not provided and then the input shaft 904 and the power extraction shaft 901 may be linked to each other through a drive belt.

In the above-mentioned embodiment, the final slow-down mechanism 907 is provided with the differential mechanism 907a and the differential locking mechanism 907b. Then, the front axle also may be provided with a differential mechanism and a differential locking mechanism.

Various modifications and changes may be made without departing from the spirit and the scope of the present invention described in the claims.

The invention claimed is:

1. A vehicle-use transmission comprising:
  an input shaft into which a driving force from an engine is inputted;
  a power extraction shaft for transmitting the driving force of the input shaft to front wheels;
  a transmission mechanism for transmitting the driving force of the input shaft to rear wheels;
  a rear-wheel intermediate shaft in a power transmission path between the power extraction shaft and the transmission mechanism, the rear-wheel intermediate shaft being configured to transmit the driving force through a helical gear attached to the rear-wheel intermediate shaft; and
  tapered roller bearings for supporting the rear-wheel intermediate shaft, each of the tapered roller bearings including:
    an outer race abutting against a transmission case of the transmission;
    an inner race abutting against the rear-wheel intermediate shaft; and
    rollers revolving and located between the outer race and the inner race;
  wherein each of the tapered roller bearings is configured such that an imaginary extension of a raceway surface of the outer race, an imaginary extension of a raceway surface of the inner race, and a vertex of an imaginary cone formed by the respective rollers intersects with each other at one intersection point on an imaginary longitudinal centerline of the rear-wheel intermediate shaft; and
  wherein each of the tapered roller bearings is configured such that the intersection point of each of the roller bearings is located outside of the rear-wheel intermediate shaft and beyond a shaft end closest to the respective one of the roller bearings.

2. The transmission according to claim 1, wherein:
  the tapered roller bearings are provided on opposite sides of the helical gear in the form of a pair, and
  between the helical gear and one of the tapered roller bearings located closest to the helical gear, an elastic member abuts against the helical gear, and a collar abuts against the elastic member and the one of the tapered roller bearings such that the tapered roller bearings are precompression-adjusted by the elastic member.

3. The transmission according to claim 2, wherein the elastic member includes a dish spring.

4. The transmission according to claim 1, wherein a transmission case of the transmission is formed of a right case portion and a left case portion divided apart from the right case portion.

5. A vehicle-use transmission comprising:
  an input shaft into which a driving force from an engine is inputted;
  a power extraction shaft for transmitting the driving force of the input shaft to front wheels;
  a transmission mechanism for transmitting the driving force of the input shaft to rear wheels;
  a rear-wheel intermediate shaft in a power transmission path between the power extraction shaft and the transmission mechanism, the rear-wheel intermediate shaft being configured to transmit the driving force through a helical gear attached to the rear-wheel intermediate shaft; and
  tapered roller bearings for supporting the rear-wheel intermediate shaft, each of the tapered roller bearings including:
    an outer race abutting against a transmission case of the transmission;
    an inner race abutting against the rear-wheel intermediate shaft; and
    rollers revolving and located between the outer race and the inner race;
  wherein each of the tapered roller bearings is configured such that a vertex of an imaginary cone formed by each respective roller is on an imaginary longitudinal centerline of the rear-wheel intermediate shaft at an intersection point located outside of the rear-wheel intermediate shaft and beyond a shaft end closest to the respective one of the roller bearings.

6. The transmission according to claim 5, wherein:
  the tapered roller bearings are provided on opposite sides of the helical gear in the form of a pair, and
  between the helical gear and one of the tapered roller bearings located closest to the helical gear, an elastic member abuts against the helical gear, and a collar abuts against the elastic member and the one of the tapered roller bearings such that the tapered roller bearings are precompression-adjusted by the elastic member.

7. The transmission according to claim 6, wherein the elastic member includes a dish spring.

8. The transmission according to claim 5, wherein a transmission case of the transmission is formed of a right case portion and a left case portion divided apart from the right case portion.

* * * * *